(12) United States Patent
Kosaki

(10) Patent No.: US 8,122,589 B2
(45) Date of Patent: Feb. 28, 2012

(54) METHOD OF MANUFACTURING AN ELECTRIC MOTOR

(75) Inventor: Tomohiro Kosaki, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 148 days.

(21) Appl. No.: 12/562,233

(22) Filed: Sep. 18, 2009

(65) Prior Publication Data

US 2010/0066185 A1    Mar. 18, 2010

(30) Foreign Application Priority Data

Sep. 18, 2008   (JP) .................................. 2008-239888

(51) Int. Cl.
*H02K 15/00*    (2006.01)

(52) U.S. Cl. ................ 29/596; 29/595; 29/597; 29/598; 427/116; 427/386

(58) Field of Classification Search ............... 29/596, 29/595, 597, 598; 310/71, 201; 427/116, 427/386, 430.1

See application file for complete search history.

(56) References Cited

U.S. PATENT DOCUMENTS

| 4,642,885 A * | 2/1987 | King ............................. 29/596 |
| 6,579,566 B1 * | 6/2003 | Moser et al. ................... 427/116 |
| 7,382,069 B2 * | 6/2008 | Kumakura et al. ............ 310/71 |
| 2005/0275296 A1 | 12/2005 | Kumakura et al. |
| 2007/0222322 A1 | 9/2007 | Yokota |

FOREIGN PATENT DOCUMENTS

| JP | 2005065440 | 3/2005 |
| JP | 2005-328638 | 11/2005 |
| JP | 2005328640 | 11/2005 |
| JP | 2007-259595 | 10/2007 |
| JP | 2008125170 | 5/2008 |

OTHER PUBLICATIONS

English language Abstract of JP 2005-328638, Nov. 24, 2005.
English language Abstract of JP 2007-259595, Oct. 4, 2007.
Japan (JP Appl. No. 2008-239888) Office action, mail date is Jul. 13, 2010.
Japan (JP Appl. No. 2008-239888) Office action, mail date is Nov. 24, 2010.

* cited by examiner

*Primary Examiner* — Thiem Phan
(74) *Attorney, Agent, or Firm* — Greenblum & Bernstein

(57) ABSTRACT

There is provided a method of manufacturing an electric motor. To begin with, a stator is provided by fixing a stator winding on a stator core. The stator winding has a coil end projecting from one end face of the stator core. Subsequently, a lead wire is drawn out from the coil end radially outward thereof. A connecting terminal is fixedly mounted to a distal end of the lead wire. A terminal block is provided such that the terminal block is held at a position to be finally fixed relative to the stator. The lead wire is bent toward the terminal block. The connecting terminal is electrically connected to the terminal block. An insulator is coated on the lead wire and the coil end by impregnating the lead wire and the coil end with liquid insulating material.

5 Claims, 4 Drawing Sheets

METHOD OF MANUFACTURING AN ELECTRIC MOTOR

BACKGROUND OF THE INVENTION

The present invention relates to an electric motor wherein the stator winding of the electric motor has a coil end projecting from one end face of the stator core of the electric motor, a lead wire is drawn out from the coil end and electrically connected to a terminal block that is located radially outward of the stator core. The present invention also relates to a method of manufacturing such an electric motor.

An electric motor includes a stator having a stator core and a stator winding fixed on the stator core. Japanese Unexamined Patent Application Publication No 2005-328638 discloses an electric motor including a stator winding having coil ends projecting from the stator core of the electric motor. Lead wires are drawn out from one of the coil ends for electrically connecting the stator winding to power source. The lead wires have axial extensions extending out from the coil end axially of the stator core, circumferential extensions extending circumferentially of the stator core from the axial extensions and radial extensions extending radially outwardly of the stator core from the circumferential extensions.

Part of the coil end and the lead wires that is distanced axially from one end face of the stator core for more than a predetermined distance is covered with resin. Fixing the circumferential extensions of the lead wires on the coil end by the resin, excessive vibrations of the lead wires are prevented successively in a case wherein the axial extensions and the radial extensions of the lead wires are spaced away from each other for a longer distance thereby to increase the circumferential extensions of the lead wires.

The stator winding having the coil end is commonly made of a copper wire covered with enamel. The electrical insulation of the coil end and the lead wires is accomplished by only enamel.

The present invention is directed to an electric motor and a method of manufacturing the electric motor in which the coil end and the lead wire drawn out from the coil end are insulated effectively and the insulation for the coil end and the lead wire is accomplished efficiently.

SUMMARY OF THE INVENTION

In accordance with an aspect of the present invention, there is provided a method of manufacturing an electric motor. As the first step, a stator is provided by fixing a stator winding on a stator core. The stator winding has a coil end projecting from an end face of the stator core. As the second step, a lead wire is drawn out from the coil end radially outward thereof. As the third step, a connecting terminal is fixedly mounted to a distal end of the lead wire. As the fourth step, a terminal block is provided such that the terminal block is held at a position to be finally fixed relative to the stator. As the fifth step, the lead wire is bent toward the terminal block. As the sixth step, the connecting terminal is electrically connected to the terminal block. As the seventh step, an insulator is coated on the lead wire and the coil end by impregnating the lead wire and the coil end with liquid insulating material.

In accordance with another aspect of the present invention, there is provided an electric motor that includes a stator, a terminal block, a connecting terminal and an insulator. The stator has a stator core and a stator winding fixed on the stator core. The stator winding has a coil end projecting from an end face of the stator core. A lead wire is drawn out from the coil end radially outward thereof and bent such that a distal end of the lead wire is directed toward the end face of the stator core. The terminal block is fixed at a position that is in the radial outside of the stator core. The connecting terminal is fixedly mounted to the distal end of the lead wire and electrically connected to the terminal block. The insulator is coated on the lead wire and the coil end.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE PREFERRED EMBODIMENTS

The following will describe the electric motor and a method of manufacturing the electric motor according to the preferred embodiment of the present invention with reference to FIGS. 1 through 7. The electric motor to be described in the present preferred embodiment is a propulsion motor adapted for use in an industrial vehicle. The front and the rear of the electric motor in the following description are indicated by the arrow Y in FIG. 1.

Figure 1:
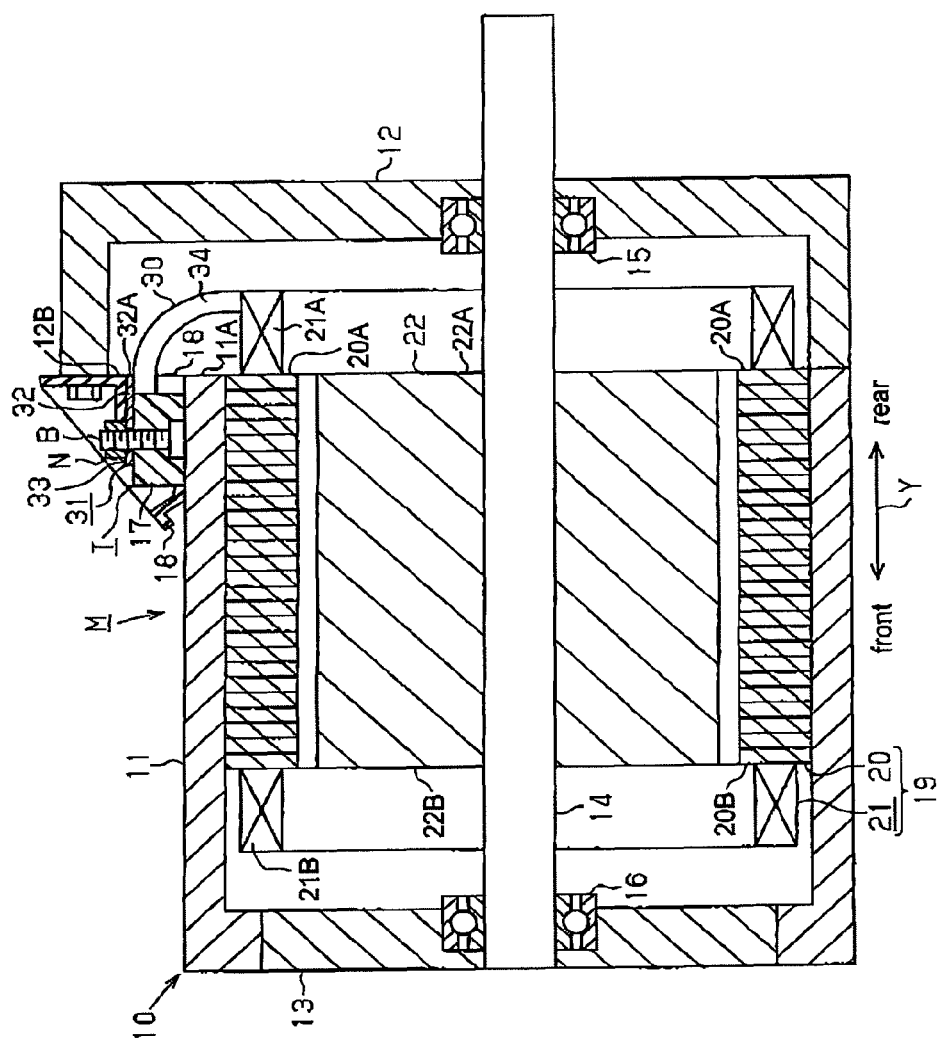
FIG. 1 is a longitudinal sectional view showing an electric motor according to a preferred embodiment of the present invention.

Referring to FIG. 1, the electric motor M shown in its longitudinal sectional view includes a housing indicated generally by reference numeral 10. The housing 10 includes a cylindrical frame 11 with opened front and rear ends, a first end bracket 12 joined to the rear end of the frame 11 and a second end bracket 13 joined to the front end of the frame 11.

Thus, the first end bracket 12 generally covers the opened rear end of the frame 11. With the first end bracket 12 joined to the frame 11, the first end bracket 12 has at the upper front end thereof an opening 12B that is opened toward the frame 11. The second end bracket 13 closes the opened front end of the frame 11. The frame 11, the first end bracket 12 and the second end bracket 13 are made by die casting of aluminum alloy.

A terminal block T is fixedly mounted to the frame 11 at the top of the rear end thereof. The terminal block T includes a terminal block body 17 that is made of synthetic resin and formed into a rectangular parallelepiped and a plurality of bolts B (three bolts in the present embodiment) that are passed through the terminal block body 17 with the end of the bolts B opposite from bolt head projecting out from the top surface of the terminal block body 17 (refer to FIG. 6). The terminal block T is fixedly mounted to the frame 11 so that the rear end face of the terminal block body 17 is located forward of the rear end face 11A of the frame 11 and also that the rear end face of the terminal block body 17 faces the interior of the first end bracket 12 (or the interior of the housing 10) through the opening 12B of the first end bracket 12. The terminal block T is covered with a waterproof cover 18 that prevents permeation by water through the opening 12B of the first end bracket 12.

A rotary shaft 14 is disposed in the housing 10 and rotatably supported at the rear end thereof by a bearing 15 provided in the first end bracket 12 and at the front end thereof by a bearing 16 provided in the second end bracket 13.

The electric motor M further includes a stator 19 that is fixedly mounted on the inner circumferential surface of the frame 11 and a rotor 22 that is mounted in the stator 19 and mounted on the rotary shaft 14 for rotation therewith. In operation of the electric motor M when power is supplied to the stator 19, the rotary shaft 14 is rotated through the rotor 22.

The stator 19 includes an annular stator core 20 and a polyphase stator winding 21 fixed on the stator core 20. The annular stator core 20 has in the axial direction thereof two opposite end faces 20A and 20B. The rear end face 20A faces the first end bracket 12 and the front end face 20B faces the second end bracket 13, respectively. The rear end face 20A of the stator core 20 serves as the end face of the stator core of the present invention. In the present embodiment, three-phase stator winding is used. The stator winding 21 is made of a copper core wire covered with enamel. The stator winding 21 has a first annular coil end 21A projecting from the rear end face 20A and a second annular coil end 21B projecting from the front end face 20B.

The rotor 22 has a rear end face 22A that faces the first end bracket 12 and a front end face 22B that faces the second end bracket 13, respectively. The rear end face 22A is recessed from the rear end face of the first coil end 21A and the front end face 22B is recessed from the front end face of the second coil end 21B, respectively. The rear end face 20A of the stator core 20 is flush with the rear end face 22A of the rotor 22. The front end face 20B of the stator core 20 is flush with the front end face 22B of the rotor 22.

Figure 2:
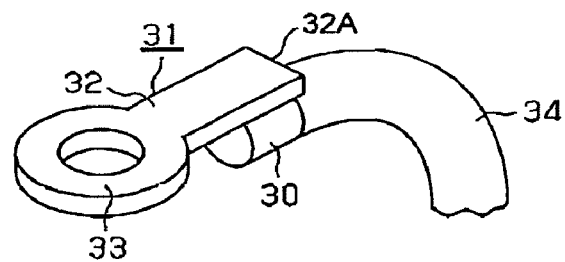
FIG. 2 is a perspective view showing a lead wire and a ring terminal of the electric motor of FIG. 1.

The stator winding 21 also has three lead wires 30 that are drawn out from the first coil end 21A. As shown in FIG. 2, a ring terminal 31 that serves as a connecting terminal is fixedly mounted to the distal end of each lead wire 30. The ring terminal 31 has at one end in the longitudinal direction thereof a base portion 32 that is in the form of a rectangular plate and at the other end thereof an annular portion 33. The ring terminal 31 is fixedly mounted to the lead wire 30 by securing the base portion 32 to the outer peripheral surface of the distal end of the lead wire 30 by thermal compression bonding. With the ring terminal 31 thus mounted to the lead wire 30, the annular portion 33 projects from the distal end of the lead wire 30 outwardly along the axial direction thereof. As shown in FIG. 1, the longitudinal dimension of the lead wire 30 is set at a minimum value that allows the lead wire 30 to be connected to the terminal block T using the ring terminal 31 and that also the ring terminal 31 to be bonded to the lead wire 30.

Figure 3:
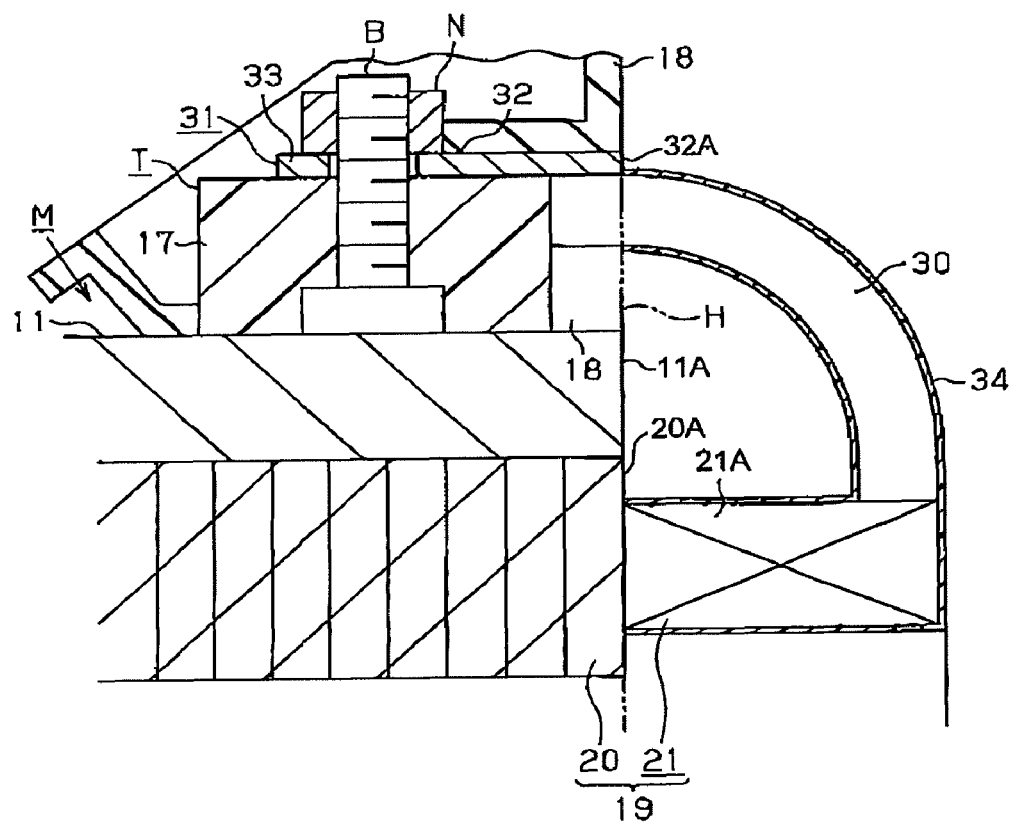
FIG. 3 is an enlarged fragmentary longitudinal sectional view showing a terminal block, the lead wire and a first coil end of the electric motor of FIG. 1.

As shown in FIGS. 1 and 3, each lead wire 30 is drawn out radially from the outer circumferential surface of the first coil end 21A and then bent in such an arcuate shape that its distal end is directed to the terminal block T. The ring terminal 31 is fixed to the terminal block T by screwing in a nut N on the bolt B passed through the annular portion 33 of the ring terminal 31 of the lead wire 30. Thus, the bolt B is electrically connected to the ring terminal 31. That is, the terminal block T is electrically connected to each lead wire 30 through its ring terminal 31.

As shown in FIG. 3, the end face of each ring terminal 31 in the longitudinal direction thereof adjacent to the lead wire 30, that is, the end face 32A of the base portion 32 is set flush with the rear end face 20A of the stator core 20 so that the end face 32A and the rear end face 20A lie in the same imaginary plane H. Thus, each end face 32A is flush with the rear end face 20A. In addition, each end face 32A lies in the same imaginary plane H as the rear end face 11A of the frame 11 and the rear end face 22A of the rotor 22. Although in the present embodiment each end face 32A lies in the same imaginary plane H as the rear end face 20A of the stator core 20, according to the present invention, the end face 32A may be slightly deviated from the rear end face 20A forward or rearward due to an error in mounting the ring terminal 31 to the terminal block T.

In the electric motor M, the first coil end 21A and the lead wires 30 are in their entirety covered with insulator 34 formed by solidifying varnish. The second coil end 21B is also in its entirety covered with the insulator 34. Varnish serves as the liquid insulating material of the present invention.

Figure 4:
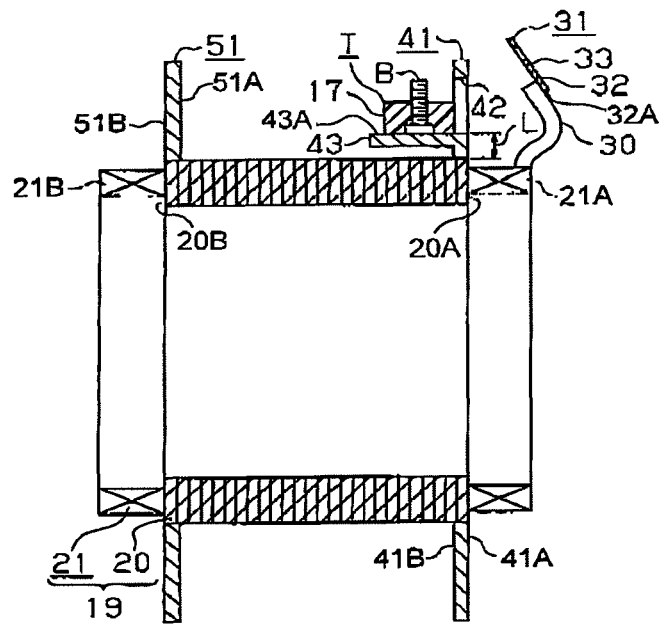
FIG. 4 is a longitudinal sectional view showing a stator of the electric motor having on the outer side thereof a first retainer and a second retainer.

The following will describe the method of manufacturing the above-described electric motor M. Firstly, the stator winding 21 is fixed on the stator core 20 to have three phases. Subsequently, a predetermined length of the lead wire 30 of each phase is drawn out radially from the outer circumferential surface of the first coil end 21A. The ring terminals 31 are fixed to the distal ends of the respective lead wires 30 by thermal compression bonding. As shown in FIG. 4, a first retainer 41 is mounted to the rear side of the stator 19 and a second retainer 51 to the front side of the stator 19, respectively.

Figure 6:
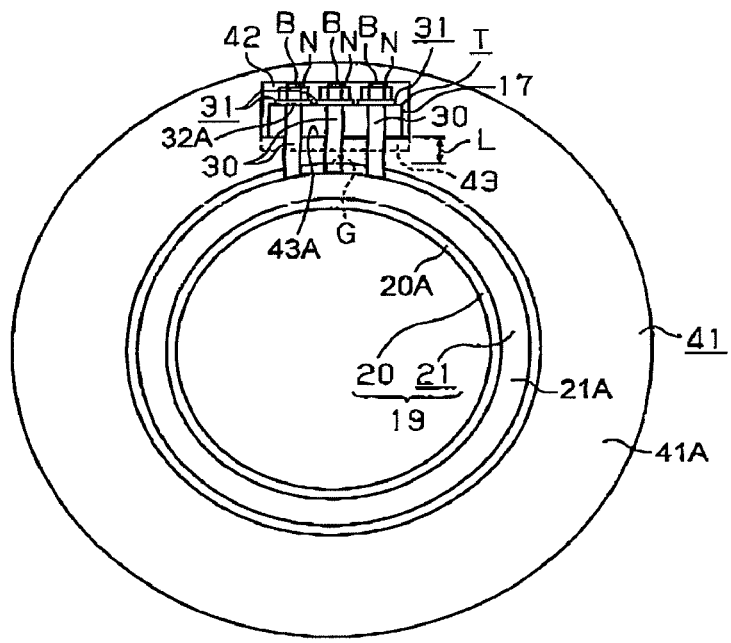
FIG. 6 is a cross sectional view showing the stator with the ring terminal electrically connected to the terminal block, as viewed from the end of the stator adjacent to the first retainer.

The first retainer 41 and the second retainer 51 will be now described. As shown in FIGS. 4 and 6, the first retainer 41 is formed of an annular thin plate. The inside diameter of the first retainer 41 is set slightly larger than the outside diameter of the stator core 20 of the stator 19. Thus, the stator 19 is formed so as to be insertable through the first retainer 41.

The first retainer 41 has front and rear faces 41B and 41A and therethrough in the upper part thereof a hole 42 through which one of the front and rear faces 41B and 41A is opened to the other. The hole 42 is made in the form of a rectangular parallelepiped with such a size that the distal ends of the lead wires 30 and the ring terminals 31 are allowed to pass therethrough. The first retainer 41 has at a position below the hole 42 a plate-like mounting base 43 that extends forward and perpendicularly from and with respect to the front face 41B. The terminal block T is fixedly mounted to the mounting base 43. As shown in FIG. 6, the length L from the top surface 43A of the mounting base 43 to the top G of the inner circumferential surface of the first retainer 41 is made slightly larger than the thickness of the frame 11.

As shown in FIG. 4, the second retainer 51 is formed of an annular thin plate. The inside diameter of the second retainer 51 is set slightly larger than the outside diameter of the stator core 20 of the stator 19. Thus, the stator 19 is formed so as to be insertable through the second retainer 51. Neither of the rear face 51A and the front face 51B of the second retainer 51 has a mounting base.

Turning back to the method of manufacturing the electric motor M, when the first retainer 41 is mounted to the rear side of the stator 19 at a position that is in the radial outside of the stator 19, the rear face 41A of the first retainer 41 is set flush with the rear end face 20A of the stator core 20, as shown in FIG. 4. Subsequently, when the second retainer 51 is mounted to the front side of the stator 19 at a position that is in the radial outside of the stator 19, the front face 51B of the second retainer 51 is set flush with the front end face 20B of the stator core 20. Then, the terminal block T is fixedly mounted to the top surface 43A of the mounting base 43 of the first retainer 41. The terminal block T is held at a predetermined position by the first retainer 41 so that the terminal block T is located at a position to be finally fixed to the frame 11 (or on the outer circumferential surface at the rear end of the frame 11) when the frame 11 is fixedly mounted to the stator 19 by fitting the frame 11 on the stator 19. That is, the terminal block T is held at a position to be finally fixed relative to the stator 19.

Figure 5:
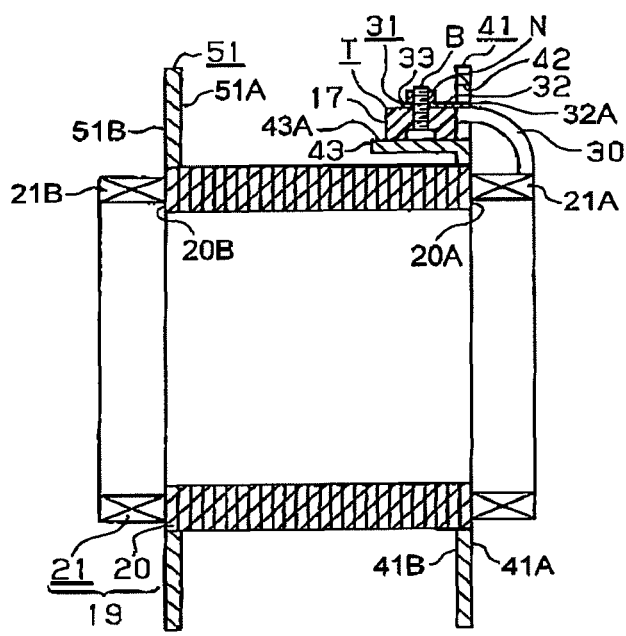
FIG. 5 is a longitudinal sectional view of the stator showing a ring terminal electrically connected to the terminal block of the first retainer.

Referring now to FIGS. 5 and 6, each lead wire 30 is bent in such an arcuate shape that its distal end is directed to the terminal block T, passed through the hole 42 of the first retainer 41 and drawn out from the front face 41B of the first retainer 41. The ring terminal 31 of each lead wire 30 is held by the bolt B of the terminal block T passed through the annular portion 33 of the ring terminal 31. Then, the ring terminal 31 is such that the end face 32A of the base portion 32 of the ring terminal 31 is flush with the rear end face 20A of the stator core 20. With the ring terminal 31 thus set in place, the nut N on the bolt B is tightened thereby to mount the ring terminal 31 securely to the terminal block T.

Figure 7:
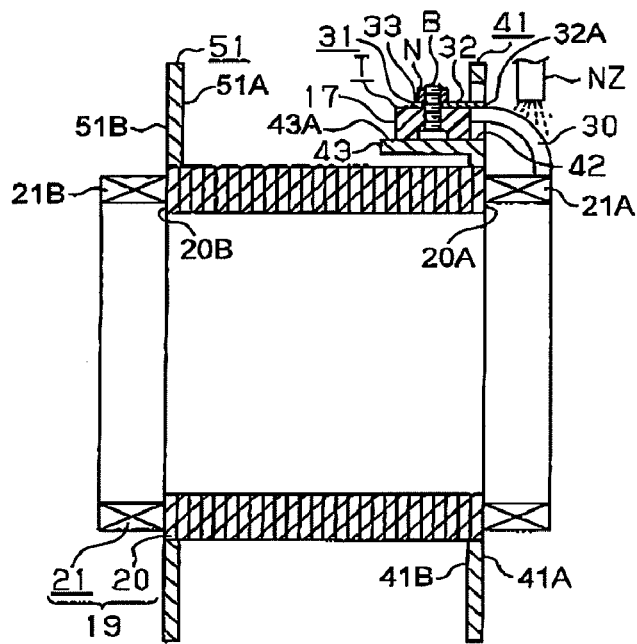
FIG. 7 is an illustrative view showing impregnating the lead wire and the first coil end of the stator of FIG. 5 with varnish.

Referring now to FIG. 7, the entirety of the first coil end 21A is impregnated with varnish by the method of trickle impregnation. That is, the region of the first coil end 21A from its rear end face to the rear end face 20A of the stator core 20, inclusive of part of the lead wires 30, is impregnated with varnish. Specifically, the first coil end 21A and part of the lead wires 30 bent as shown in FIG. 5 are impregnated with varnish by using a nozzle NZ for formation of the insulator 34. The varnish insulator 34 is coated on the entirety of the first coil end 21A and part of the lead wires 30. Similarly, the entirety of the second coil end 21B is impregnated with varnish by the method of trickle impregnation. That is, the region of the second coil end 21B from its front end face to the front end face 20B of the stator core 20 is impregnated with varnish. The varnish insulator 34 is coated over the second coil end 21B.

Then, the second retainer 51 is removed from the stator 19. The first retainer 41 is removed from the stator 19 by releasing the terminal block T from the mounting base 43. Because each lead wire 30 is held in an arcuate shape by the insulator 34, the terminal block T is also positioned at a position where the terminal block T was fixedly mounted to the mounting base 43.

Then, the stator 19 is fixedly mounted in the frame 11 by fitting the frame 11 on the stator 19. The terminal block T is fixedly mounted to the outer circumferential surface at the rear end of the frame 11. Then, the waterproof cover 18 is set to cover the terminal block T and fixedly mounted to the front end face of the first end bracket 12. Finally, the rotor 22 is mounted in the stator 19. The first end bracket 12 is joined to the rear end of the frame 11 and the second end bracket 13 is joined to the front end of the frame 11. Thus, the electric motor M is completed.

The above-described embodiment offers the following advantageous effects.

(1) In manufacturing the electric motor M, each lead wire 30 drawn out from the first coil end 21A is previously fixed to the terminal block T by using the ring terminal 31 and then the first coil end 21A and the lead wire 30 are impregnated with varnish. Thus, the lead wires 30 and the first coil end 21A are impregnated with the insulator 34 with the lead wires 30 then positioned in place relative to the first coil end 21A. Therefore, unlike the case where the copper wires of the lead wires 30 and the first coil end 21A are covered with enamel only, the lead wires 30 and the first coil end 21A according to the present embodiment of the present invention are insulated effectively by the insulator 34. In addition, because the insulator 34 is coated simultaneously on the part of the lead wires 30 and the entirety of the first coil end 21A, insulation for the lead wires 30 and the first coil end 21A is accomplished efficiently and easily as compared to the case where the lead wires 30 and the first coil end 21A are covered separately with insulators.

(2) The terminal block T is fixedly mounted to the outer circumferential surface at the rear end of the frame 11 and the lead wires 30 are drawn out radially from the outer circumferential surface of the first coil end 21A. The ring terminal 31 is fixed to the distal end of each lead wire 30 by thermal compression bonding and the ring terminal 31 with the lead wire 30 is connected to the terminal block T such that the end face 32A of the ring terminal 31 is flush with the rear end face 20A of the stator core 20. Thus, the lead wires 30 and the first coil end 21A that need to be insulated are all located rearward of the rear end face 20A of the stator core 20. Therefore, the insulator 34 is simultaneously coated on the part of the lead wires 30 and the entirety of the first coil end 21A merely by impregnating entire area behind the rear end face 20A of the stator core 20 with varnish.

(3) In the electric motor M of the embodiment according to the present invention, the terminal block T is fixed to the outer circumferential surface at the rear end of the frame 11. Therefore, each lead wire 30 that is drawn out from the first coil end 21A is made shorter as compared to the case where the terminal block T is fixed to the outer circumferential surface at the front end of the frame 11. Because the amount of copper wire and enamel used for the lead wires 30 is reduced, manufacturing cost of the electric motor M is reduced and copper loss of the lead wires 30 is also reduced.

(4) The terminal block T is fixed to the outer circumferential surface at the rear end of the frame 11. The part of each lead wire 30 extends forward beyond the rear end face 11A of the frame 11 only for a short distance, and, therefore, the insulation for the lead wire 30 is accomplished by coating the insulator 34 only on the part of the lead wire 30 that is located rearward of the rear end face 11A of the frame 11. If the terminal block T is fixed to the outer circumferential surface at the front end of the frame 11, the part of each lead wire 30 that is located forward of the rear end face 11A of the frame 11 needs to be covered with an insulator such as corrugated tube. In the present embodiment, however, because the insulator 34 is simply coated on the part of the lead wires 30 that are located rearward of the rear end face 11A of the frame 11, the cost for insulating the lead wires 30 is reduced.

(5) Because the terminal block T is fixed to the outer circumferential surface at the rear end of the frame 11, the part of each lead wire 30 which is connected to the terminal block T and extends forward beyond the rear end face 11A of the frame 11 is only short. Waterproofing the connection between each lead wire 30 and the terminal block T is accomplished by only covering the terminal block T and the opening 12B with the waterproof cover 18. If the terminal block T is fixed to the outer circumferential surface at the front end of the frame 11, the part of each lead wire 30 that extends forward of the rear end face 11A of the frame 11 for a substantial distance needs to be covered with a waterproof member. In the present embodiment, however, because the terminal block T is simply covered with the waterproof cover 18, the cost for waterproofing the lead wires 30 is reduced.

(6) Impregnating of the first coil end 21A and the lead wires 30 with varnish is performed only after the ring terminal 31 has been fixed to the terminal block T with the terminal block T held at the position to be finally fixed to the frame 11, or with the terminal block T held at the position to be finally fixed relative to the stator 19. Therefore, the lead wires 30 are hardly moved after the insulator 34 is formed unlike a case where the ring terminal 31 is fixed to the terminal block T after the insulator 34 is coated on the first coil end 21A and the lead wires 30 or a case where the insulator 34 is formed after the ring terminal 31 has been fixed to the terminal block T and then the ring terminal 31 is moved to the finally fixing position of the terminal block T together with the terminal block T. Thus, since the lead wires 30 will not be moved, the insulator 34 for the lead wires 30 and the first coil end 21A is not subjected to breakage due to the movement of the lead wires 30 toward the terminal block T or the movement of the lead wires 30 is together with the terminal block T. Consequently, the lead wires 30 and the first coil end 21A are insulated effectively by the insulator 34.

(7) The electric motor M which is mounted to an industrial vehicle and operated under a low voltage requires high electric current. Therefore, the electric motor M tends to increase its size. In the present embodiment, however, each lead wire 30 is drawn radially out from the first coil end 21A and then fixed to the terminal block T which is fixedly mounted to the outer circumferential surface at the rear end of the frame 11. Therefore, the length of the lead wire 30 that is needed for the connection thereof to the terminal block T is reduced and the length of the first coil end 21A that extends out from the stator core 20 in the axial direction thereof is also reduced, as compared to the case where the lead wire 30 is drawn out rearward from the rear end face of the first coil end 21A. The electric motor M which is made thus compact in the axial direction of the housing 10 without reducing its output is easily mounted to the industrial vehicle. On the other hand, it is essential for the electric motor M carrying a large current to insulate the lead wire 30 and the first coil end 21A properly. According to the present embodiment of the present invention, the lead wire 30 and the first coil end 21A are simultaneously impregnated with varnish and the insulator 34 is coated on the lead wire 30 and the first coil end 21A, which insulate the lead wire 30 and the first coil end 21A effectively.

(8) The dimension of the lead wire 30 in its longitudinal direction is set at a minimum value that allows the lead wire 30 to be connected to the terminal block T and that also the ring terminal 31 to be bonded to the lead wire 30 by thermal compression bonding. Therefore, the lead wire 30 is prevented from being lengthened unnecessarily.

(9) In manufacturing the electric motor M, the terminal block T is fixed to the outer circumferential surface at the rear end of the frame 11 and the lead wire 30 is drawn out radially from the outer circumferential surface of the first coil end 21A. The ring terminal 31 is fixed to the distal end of each lead wire 30 by thermal compression bonding and the ring terminal 31 with the lead wire 30 is fixed to the terminal block T such that the end face 32A of the ring terminal 31 is flush with the rear end face 20A of the stator core 20. Thus, the lead wires 30 and the first coil end 21A that need to be insulated are all located rearward of the rear end face 20A of the stator core 20, so that only the parts of the lead wires 30 and the first coil end 21A which are located behind the rear end face 20A of the stator core 20 needs to be impregnated with varnish. Therefore, the impregnation can be performed rapidly because those parts which should avoid the impregnation, such as terminal block T, need not to be so treated. Consequently, the electric motor M can be manufactured efficiently, accordingly.

(10) The first retainer 41 and the second retainer 51 are mounted to the stator 19 radially outward thereof during manufacturing of the electric motor M. Such arrangement of the first retainer 41 and the second retainer 51 helps to prevent varnish from being attached to the stator 19 and the terminal block T.

(11) Varnish is used as liquid insulating material for coating the insulator 34 on the lead wires 30 and the first coil end 21A. Mechanical strength of the lead wire 30 is improved when varnish solidifies, so that the position of the lead wire 30 connected to the terminal block T is held securely, thereby preventing the lead wire 30 from being vibrated due to the vibration of the electric motor M in operation. Solidified vanish fills spaces between the lead wires 30 and in the first coil end 21A, thus serving to prevent moisture and dust from entering between the copper wires of the lead wire 30 and into the first coil end 21A.

The above-described embodiment of the present invention may be modified in various ways as exemplified below.

According to the present invention, the end face 32A of the base portion 32 of the ring terminal 31 does not need necessarily to be flush with the rear end face 20A of the stator core 20. In such a case, the insulator 34 is coated on the lead wire 30 and the first coil end 21A by modifying the shape of the first retainer 41.

Although in the above-described embodiment the lead wire 30, the first coil end 21A and the second coil end 21B are impregnated with varnish by the method of trickle impregnation, the impregnation may be performed by immersing the lead wire 30, the first coil end 21A and the second coil end 21B in varnish in a container.

Although in the above-described embodiment varnish is used as a liquid insulating material, any other liquid insulating material may be used for impregnating the lead wire 30, the first coil end 21A and the second coil end 21B.

In the above-described embodiment, the lead wire 30 is drawn out radially outward from the first coil end 21A and the ring terminal 31 is fixed to the distal end of the lead wire 30. Then, the terminal block T is held at the position to be finally fixed relative to the stator 19. The ring terminal 31 is fixed to the terminal block T with the lead wire 30 bent in such an arcuate shape that its distal end is directed to the terminal block T. However, the lead wire 30 may be drawn out radially outward from the first coil end 21A after the terminal block T is held at the position to be finally fixed to the stator 19. In this case, the ring terminal 31 is fixed to the terminal block T with the lead wire 30 bent in such an arcuate shape that its distal end is directed to the terminal block T after the ring terminal 31 is fixed to the distal end of the lead wire 30.

Although in the above-described embodiment the electric motor M is mounted on the industrial vehicle, the electric motor of the present invention may be mounted on an electric vehicle.

Although in the above-described embodiment the frame 11 and the stator core 20 are formed by separate members, the stator core 20 may be formed so as to serve also as the frame 11. That is, the electric motor may be of a frameless type. In such a case, the first end bracket 12 and the second end bracket 13 are omitted and the electric motor M is treated as a built-in member. Forming the insulator 34 on the lead wires 30 and the first coil end 21A with the terminal block T held at the position to be finally fixed relative to the stator 19, the insulator 34 is prevented from being broken.

What is claimed is:

1. A method of manufacturing an electric motor, comprising:

provthe a stator by fixing a stator winding on a stator core, wherein the stator winding has a coil end projecting from an end face of the stator core;

drawing out a lead wire from the coil end radially outward thereof;

fixedly mounting a connecting terminal to a distal end of the lead wire;

providing a terminal block such that the terminal block is held at a position to be finally fixed relative to the stator;

holding the terminal block relative to the stator by a retainer;

bending the lead wire toward the terminal block;

electrically connecting the connecting terminal to the terminal block; and coating an insulator on the lead wire and the coil end by impregnating the lead wire and the coil end with liquid insulating material; and removing the retainer after the step of coating the insulator.

2. The method according to claim 1, further comprising:

fixedly mounting a cylindrical frame on the stator after the coating of the insulator; and fixedly mounting the terminal block to an outer circumferential surface of the cylindrical frame.

3. The method according to claim 1, wherein after electrically connecting the connecting terminal to the terminal block, an end face of the connecting terminal adjacent to the distal end of the lead wire is flush with the end face of the stator core.

4. The method according to claim 1, wherein the liquid insulating material is varnish.

5. The method according to claim 1, wherein the impregnation in the coating of the insulator is trickle impregnation.

* * * * *